United States Patent Office 3,556,767
Patented Jan. 19, 1971

3,556,767
METHOD OF SELECTIVELY KILLING UNDESIRABLE WEEDS
Kenneth T. Mecklenborg, Cincinnati, Ohio, assignor to Emery Industries, Inc., Cincinnati, Ohio, a corporation of Ohio
No Drawing. Filed July 24, 1967, Ser. No. 655,279
Int. Cl. A01n 9/24
U.S. Cl. 71—122                                                6 Claims

ABSTRACT OF THE DISCLOSURE

A post-emergence herbicidal composition is provided which comprises an emulsion containing water, a non-ionic emulsifier, and an aliphatic alcohol containing 4 to 22 carbon atoms. The herbicides are effective in killing such weeds as mustard, foxtail, crabgrass and pigweed, and can be made selective so as to have no substantial adverse effect on certain desired crops such as beans and cotton while being toxic to certain undesirable plants.

BACKGROUND OF THE INVENTION

This invention relates to a composition and method for killing weeds and other undesirable plant growth. More particularly, it relates to a post-emergence herbicide which kills certain forms of plant life while being non-toxic to others.

The use of chemical herbicides in the control of plant growth has developed largely in the 20th century. The period since World War II has seen a particularly dramatic growth in the production and use of herbicides, and many diverse types of herbicidal compositions have been introduced since that time. The use of these herbicides has been of vast importance in the elimination and control of weeds in agricultural land, range land, parks and recreational areas, and the like.

Herbicides can be classified generally according to whether they are selective or nonselective, and according to whether they are applied through the air to the foliage of the plants being treated or through the soil to the roots of such plants. Selective herbicides act to kill some members of a given plant population with little or no injury to surrounding plants of certain other varieties. Such selective herbicides are particularly desirable for use in weed elimination from agricultural crops, flower gardens, and the like.

Nonselective herbicides, on the other hand, kill all plants which they contact. These nonselective compositions are used widely in reclaiming land covered by brush and undesired trees, in keeping roadsides, ditch banks, and the like free of weeds, and for eliminating plants infested with insects or plant diseases.

Most herbicides applied through the soil are "preemergence" herbicides, i.e. they destroy the unwanted plant before it emerges from the soil. If the pre-emergence herbicide is properly selective, it can be used to allow only desired plant growth to emerge from the soil. "Post-emergence" herbicides are used to eliminate plants which have already emerged from the soil. The post-emergence herbicide is applied to the foliage of the plants to be destroyed.

The achievement of selectivity in post-emergence herbicides is of course highly desirable. A certain degree of selectivity can be achieved by differential wetting. Thus, for example, ground weeds surrounding tall crops such as corn can often be eliminated without undue damage to the crop by ground-level spraying; however, such application is often not practical. Efficient and large-scale spraying with post-emergence herbicides requires that the crops as well as the surrounding weeds be contacted with the herbicidal materials, creating a need for herbicides which can be made selective, that is, phytotoxic to undesirable plant life but having no substantial effect upon certain desired plant life. The herbicides of this invention are made selective by proper formulation of components.

Many of the diverse herbicidal compositions heretofore developed exhibit various types of selectivity and are useful in eliminating weeds from numerous specific agricultural or flower crops. A continuing search goes on for new, improved and less costly herbicide compositions, including new herbicides having superior herbicidal activity or improved selectivity.

Accordingly, it is a primary object of the present invention to provide a new herbicidal composition which is effective in eliminating various types of undesirable plant life including crabgrass, foxtail, mustard, pigweed and the like.

Another object of the present invention is to provide a herbicidal composition which can be used in the destruction of various types of weeds, and can be used to destroy weeds surrounding certain agricultural crops without unduly affecting the crops themselves.

Still another object of the present invention is to provide a readily available and relatively inexpensive herbicidal composition based on simple organic esters which achieve efficient herbicidal activity.

Yet another object of this invention is to provide a method for eliminating undesirable plant growth by contacting weeds and other undesirable plants with the herbicidal compositions of this invention.

Additional objects and advantages of the invention will be set forth in part in the description which follows, and in part will be obvious from the description, or may be learned by practice of the invention, the objects and advantages being realized and attained by means of the methods, processes, and improvements particularly pointed out in the appended claims.

DESCRIPTION OF THE INVENTION

To achieve the foregoing objects, the present invention provides a herbicidal composition comprising an emulsion containing water, an emulsifier, and an aliphatic alcohol containing 4 to 22 carbon atoms.

The invention further provides a method for killing undesirable plant growth which comprises applying to the plants a herbicidal amount of an aqueous emulsion of the above-described aliphatic alcohols, the emulsion containing an emulsifying agent in a weight ratio to said alcohol of between about 7:1 and 1:7.

The invention consists in the novel compositions, methods, processes, steps and improvements shown and described. It is to be understood that both the foregoing general description and the following detailed description are exemplary and explanatory but are not restrictive of the invention.

The primary active ingredient of the herbicidal composition of this invention is a branched or normal aliphatic alcohol containing 4 to 22 carbon atoms. These compounds are relatively simple, inexpensive and are readily available. Herbicide compositions based on these alcohols can be prepared and used economically in weed control.

The alcohol component of the present herbicide is preferably a $C_6$ to $C_{12}$ aliphatic alcohol. Thus, preferred ingredients of the herbicidal compositions of this invention include such saturated alcohols as n-hexanol, n-heptanol, n-octanol, n-nonanol, n-decanol, isooctanol, 2-ethylhexanol, isodecanol, 2,6-dimethyl-3-methylol heptane, 2-hexanol, 3-hexanol, 2-octanol, 2-decanol, 4-decanol, and the like or mixtures thereof.

The alcohol herbicides of this invention are prepared as concentrates comprising one or more alcohols of the type described above, an emulsifier and water. The concentrate is generally an invert-type emulsion prepared by adding sufficient water to predetermined amounts of the alcohol and the emulsifier to form a gel.

The herbicide concentrate can contain varying weight ratios of emulsifier to alcohol, with such weight ratios generally varying between about 7:1 and 1:7. Weight ratios outside of this range generally do not produce satisfactory emulsions. When the emulsifier is present in the herbicide concentrate in certain preferred ratios to the alcohol component, it has been found to exert a synergistic effect upon the toxicity of the alcohols to certain plant life. Weight ratios of emulsifier to alcohol between about 3:2 and 2:3 have been found particularly effective in this respect and hence emulsifier to alcohol ratios in that range are preferred.

A wide variety of emulsifiers, preferably nonionic, can be used in the herbicidal compositions of this invention. Preferred emulsifiers include polyoxyalkylated sorbitan esters, such as polyoxyalkylene derivatives of sorbitan monolaurate. These emulsifiers are sold under the trade names EMSORB and TWEEN.

The emulsifiers used in the compositions of this invention should have a hydrophilic-lipophilic balance of from about 12 to 20, and preferably between 16 and 18. The high hydrophilic emulsifier capacities of such emulsifying agents are desirable since the herbicidal concentrate is applied to weeds and the like in the form of an aqueous emulsion.

Other emulsifying agents which can be satisfactorily used in the compositions of this invention include alkyl aryl polyoxyethylene glycol ethers such as those sold under the trade name Igepal CO630, alkylated aryl polyether alcohols such as those sold under the trade name Triton X45, long chain fatty acid esters containing multiple ether linkages, and various other emulsifiers, such as other condensation products of ethylene oxide or propylene oxide with aliphatic alcohols, amines, or carboxylic acids having long chain hydrocarbon radicals. Other examples of suitable emulsifiers for use in the herbicides of this invention include the condensation product of actadecyl alcohol with 20 to 30 mols of ethylene oxide, the condensation product of commercial oleyl amine with about 15 mols of ethylene oxide, and the like. Mixtures of more than one of such emulsifiers can also be used in the herbicidal compositions of this invention, and, certain anionic emulsifiers such as sodium petroleum sulphonate compounds and the like can be used in combination with the above-noted nonionic emulsifiers, if desired.

In use of the herbicides of this invention, the concentrate is diluted with water to form a stable aqueous emulsion which is applied directly to the weeds or other undesirable plants to be eliminated. Sufficient water is added to the concentrate to produce an emulsion having an alcohol concentration between about 0.05% and about 25% by weight or higher.

The optimum concentration for any particular usage depends on the particular type of plants to which the herbicide is to be applied, and on the health and age of the plants being treated. Particularly efficient aqueous herbicide emulsions of this invention have alcohol concentrations of about 0.1% to about 5.0% by weight, with the more concentrated emulsion being applied to hardy plants or plants which have reached peak growth.

The aqueous emulsion is normally applied as a spray, although any other conventional method of application can also be used. The spray is generally applied to the plant foliage to the "run-off" point, that is, to the point where droplets of the herbicide form and begin to run off the plant.

The herbicidal emulsions of this invention can be used for killing various types of undesirable plant life. For example, these emulsions are effective in the elimination of foxtail, crabgrass, mustard grass and pigweed.

The present herbicides show selectivity in eliminating weeds from certain desired crops while having no significant adverse effect on the crops themselves. For example, these herbicides can be formulated so as to have substantially no adverse effect on beans and cotton but be made effective in eliminating weeds surrounding these crops. Another advantage of the herbicides is that they are relatively nontoxic to animals including humans and thus may be safely used.

For a clearer understanding of the invention, specific examples of it are set forth below. These examples are merely illustrative and are not to be understood as limiting the scope and underlying principles of the invention in any way. All parts and percentages referred to herein are by weight unless otherwise specifically indicated.

EXAMPLES

A variety of plants and weeds were tested to determine the post-emergence efficiency of the herbicide emulsions of the present invention. The plant samples for these tests were prepared by filling duplicate, porous, paper pots with vermiculite and seeding the pots with the plants used in the tests. After ten days the test plants had reached a suitable size, and they were sprayed with the various herbicides tested. The plants were then observed for ten days and given an injury rating by comparison with untreated controls.

The test plants were grown under artificial light with irrigation provided by placing the porous pots in a small amount of water in stainless steel trays. The post-emergence herbicide applications were made to the point of run-off with a DeVilbiss atomizer operating at 5 p.s.i.

The herbicide compositions tested are set forth below. The abbreviation set forth in parentheses after each composition is used in the Table below to indicate the particular alcohol used in each herbicide composition tested. The alcohols tested were:

n-octanol (n–$C_8$)
n-decanol (n–$C_{10}$)
n-dodecanol (n–$C_{12}$)
mixture of n-octanol-n-decyl alcohols (n–$C_8$–$C_{10}$)
mixture of n-hexyl, n-octyl and n-decyl alcohols (n–$C_6$–$C_{10}$)
2-ethylhexyl alcohol (2–EHA)
isooctanol (iso–$C_8$)

The concentration of the alcohol in each test herbicide composition, the particular type of plant or weed contacted with the herbicide, and the degree and type of injury occurring to the plant contacted with the herbicide are also indicated in the Table. The degree of injury is reported on a scale from 0 to 5, where:

0=no damage
1=slight damage
2=moderate damage
3=moderate to severe damage
4=severe damage
5=death and the kind of injury reported according to the following code:

C=chlorosis
E=epinasty
G=general necrosis
L=local necrosis
NF=nodule formation
S=stunting
SC=stem curling
T=tip burn
W=wilting The emulsifier used in preparing each of the test herbicide compositions was Emsorb 6915, a polyoxyethylene sorbitan monolaurate ester containing about 20 mols of ethylene oxide per mol of ester. In each of the test compositions the weight ratio of alcohol to emulsifier was about 3:2.

Test plants were also treated for comparative purposes with two commercial herbicides:

2,4-D—(2,4-dichlorophenoxyacetic acid)
Atrazine—(2-chloro-4-(ethyl-6-isopropylamino)-sec-triazine)

and injury ratings were taken on these plants and on untreated control plants. The results of these tests are also reported in the table.

TABLE

| Example No. | Alcohol used | Concentration, weight percent | Mustard | Pigweed | Crabgrass | Foxtail | Corn | Wheat | Cotton | Snap beans |
|---|---|---|---|---|---|---|---|---|---|---|
| 1 | n-$C_8$ | 0.5 | 5G-W | 5G-W | 5T-W | 4T | 4L | 2L | 1L | 0 |
| 2 | n-$C_8$ | 0.25 | 1L | 1L | 2W | 1L-T | 2L | 1L | 0 | 0 |
| 3 | n-$C_{10}$ | 0.5 | 5G-W | 5G-W | 5T-W | 5T-W | 5W | 3E-W | 1L | 1L |
| 4 | n-$C_{10}$ | 0.25 | 4G-W | 5G-W | 5T-W | 4T-3W | 2L | 2E-W | 1L | 1L |
| 5 | n-$C_{12}$ | 0.5 | 3W | 5G-W | 4W-5T | 3W-4T | 2L | 2L | 2L | 2G |
| 6 | n-$C_{12}$ | 0.25 | 1L-W | 5G-W | 5T-3W | 3W-4T | 1L | 1L | 1L | 1L |
| 7 | n-$C_8$-$C_{10}$ | 0.5 | 3L-W | 5G-W | 5T-W | 5T-W | 5W | 3E-W | 1L | 1L |
| 8 | n-$C_8$-$C_{10}$ | 0.25 | 1W | 4G-W | 4T-W | 4T-2W | 4L | 2E-W | 0 | 0 |
| 9 | n-$C_6$-$C_{10}$ | 0.5 | 3L-W | 4G-W | 5T-W | 4T-W | 4L-W | 2E-L-T | 1L | 0 |
| 10 | n-$C_6$-$C_{10}$ | 0.25 | 0 | 2T | 2L-W | 3T-W | 1L-T | 1L | 0 | 0 |
| 11 | 2-EHA | 0.5 | 1L | 2L-W | 4T-W | 1W-L | 3L | 2L | 0 | 0 |
| 12 | 2-EHA | 0.25 | 0 | 1W | 1L-T | 1L | 2L | 0 | 0 | 0 |
| 13 | Iso-$C_8$ | 0.5 | 1L | 1L | 3T-2W | 2T | 3L | 2L | 0 | 0 |
| 14 | Iso-$C_8$ | 0.25 | 0 | 0 | 1L | 0 | 2L | 0 | 0 | 0 |
| 15 | Emulsifier | 1.2 | 1L | 1L | 1T | 1T | 0 | 2T | 0 | 0 |
| 16 | 2,4-D[1] | (*) | 5G | 5G | 2S | 0 | 0 | 1T | 2E-L | 4E |
| 17 | Atrazine[2] | (*) | 5G | 4G | 3G | 3G | 0 | 3C | 0 | 4G |
| 18 | Untreated | 0 | 0 | 0 | 0 | 0 | | 0 | 0 | 0 |

[1] 2,4-dichlorophenoxyacetic acid.
[2] 2-chloro-4-(ethyl-6-isopropylamino)-sec-triazine.
*Equivalent to 10 lbs. per acre.

The results shown in the table indicate the good herbicidal activity of the present compositions against various types of weeds, and particularly against mustard, pigweed, crabgrass, and foxtail. The toxicity of the herbicides of this invention to these weeds is at least as good, and generally better, than the commercial 2,4-D and Atrazine herbicides. While the herbicides of this invention are somewhat toxic to corn, they show only very low toxicity to snap beans and cotton, and hence are highly effective in weed control in bean and cotton fields.

The invention in its broader aspects is not limited to the specific details shown and described; departures may be made from such details within the scope of the accompanying claims without departing from the principles of the invention and without sacrificing its chief advantages.

I claim:

1. A method for selectively killing undesirable weeds in the presence of desirable crops comprising applying to said weeds as a post emergent herbicide a herbicidal amount of an aqueous emulsion of a saturated aliphatic alcohol containing 6 to 12 carbon atoms.

2. The method of claim 1 wherein said alcohol is applied in the form of an aqueous emulsion.

3. The method of claim 2 wherein said emulsion contains an emulsifying agent in a weight ratio of between about 7:1 and 1:7.

4. The method of claim 2 in which the concentration of the alcohol in the emulsion is between about 0.05% and about 25% by weight.

5. The method of claim 4 in which the concentration of the alcohol in the emulsion is between about 0.1% and 5.0% by weight.

6. The method of claim 5 in which the weight ratio of emulsifier to alcohol is between about 3:2 and 2:3.

References Cited

UNITED STATES PATENTS 3,438,765   4/1969   Tso et al. _____ 71—78
2,575,282   11/1951   McKay, Jr., et al. _____ 71—79

FOREIGN PATENTS 721,208   1/1955   Great Britain.

JAMES O. THOMAS, Jr., Primary Examiner